(12) United States Patent
Boyd et al.

(10) Patent No.: US 12,505,737 B2
(45) Date of Patent: Dec. 23, 2025

(54) SYSTEM AND METHOD FOR DETECTING SPEED ANOMALIES IN A CONNECTED VEHICLE INFRASTRUCTURE ENVIRONMENT

(71) Applicant: Yunex LLC, Wilmington, DE (US)

(72) Inventors: Priscilla Nagashima Boyd, Austin, TX (US); Pratik Shivarkar, Austin, TX (US)

(73) Assignee: Yunex LLC, Wilmington, DE (US)

( * ) Notice: Subject to any disclaimer, the term of this patent is extended or adjusted under 35 U.S.C. 154(b) by 878 days.

(21) Appl. No.: 17/262,543

(22) PCT Filed: Sep. 30, 2019

(86) PCT No.: PCT/US2019/053747
§ 371 (c)(1),
(2) Date: Jan. 22, 2021

(87) PCT Pub. No.: WO2021/066784
PCT Pub. Date: Apr. 8, 2021

(65) Prior Publication Data
US 2022/0114886 A1    Apr. 14, 2022

(51) Int. Cl.
*G08G 1/052* (2006.01)
*G01S 19/13* (2010.01)
*G08G 1/01* (2006.01)

(52) U.S. Cl.
CPC .............. *G08G 1/052* (2013.01); *G01S 19/13* (2013.01); *G08G 1/0112* (2013.01); *G08G 1/0116* (2013.01); *G08G 1/0125* (2013.01)

(58) Field of Classification Search
CPC .... G08G 1/052; G08G 1/0112; G08G 1/0116; G08G 1/0125; G08G 1/205;
(Continued)

(56) References Cited

U.S. PATENT DOCUMENTS

2011/0202305 A1* 8/2011 Willis .................. G01C 21/188
702/141
2016/0035152 A1* 2/2016 Kargupta .............. G06F 16/955
701/31.5
(Continued)

FOREIGN PATENT DOCUMENTS

EP    1533775 A1    5/2005
EP    3293489 A1 *  3/2018    ............. G01C 21/32

OTHER PUBLICATIONS

PCT International Search Report and Written Opinion of International Searching Authority mailed Jul. 2, 2020 corresponding to PCT International Application No. PCT/US2019/053747 filed Sep. 30, 2019.

*Primary Examiner* — Anne Marie Antonucci
*Assistant Examiner* — Wesam Almadhrhi
(74) *Attorney, Agent, or Firm* — Dinsmore & Shohl LLP

(57) ABSTRACT

A system (300) for detecting speed anomalies in a connected vehicle infrastructure environment includes a plurality of roadside units (200) installed at different locations within a road network, each roadside unit (200) including a wireless receiver (206) and configured to collect, via the wireless receiver (206), vehicle traffic data (210) from vehicles travelling in a road network; a vehicle traffic data evaluation module (350) with a processor (360) configured via executable instructions to receive collected vehicle traffic data (210) from the plurality of roadside units (200), the vehicle traffic data (210) comprising multiple data sets of multiple vehicles, extract first data (408) from the collected vehicle traffic data (210), combine and/or conform the first data (408) with second data (410), create vehicle profiles (414) based on combined and/or conformed first data (408) and second data (410) and road segment profiles (418) based on clustering and filtering of the vehicle profiles (414), compare a first vehicle profile (414) of the collected vehicle traffic
(Continued)

data with a road segment profile (418), and detect and output an anomaly (422) of the first vehicle profile (414) when the first vehicle profile (414) is outside a predefined threshold.

10 Claims, 2 Drawing Sheets

(58) Field of Classification Search
CPC .... G08G 1/0129; G08G 1/0141; G01S 19/13; G01C 21/30; H04L 63/1425
See application file for complete search history.

(56) References Cited

U.S. PATENT DOCUMENTS

| | | | |
|---|---|---|---|
| 2016/0104376 A1* | 4/2016 | Fowe | G08G 1/0141 |
| | | | 701/119 |
| 2016/0284212 A1* | 9/2016 | Tatourian | G08G 1/096775 |
| 2019/0096238 A1 | 3/2019 | Ran et al. | |
| 2020/0226922 A1 | 7/2020 | Hahn et al. | |
| 2020/0286372 A1* | 9/2020 | Fowe | G01C 21/3841 |
| 2020/0327807 A1 | 10/2020 | Kamrani et al. | |

* cited by examiner

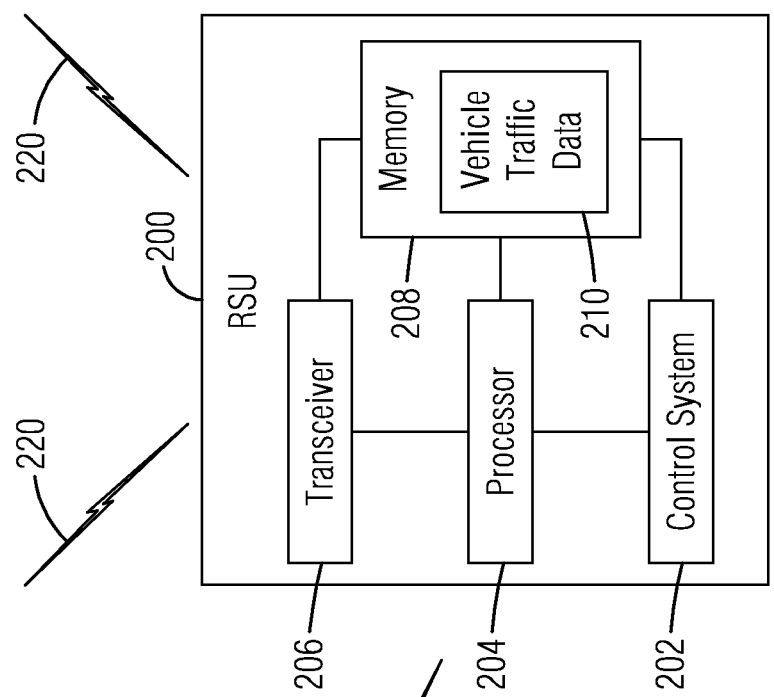
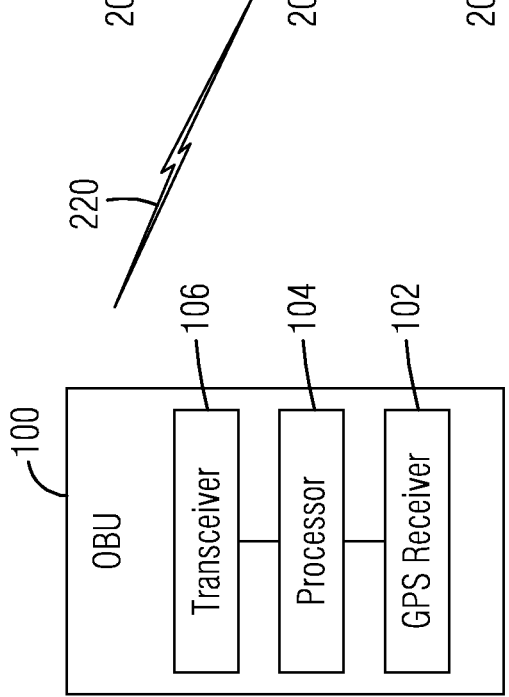

SYSTEM AND METHOD FOR DETECTING SPEED ANOMALIES IN A CONNECTED VEHICLE INFRASTRUCTURE ENVIRONMENT

BACKGROUND

1. Field

Aspects of the present disclosure generally relate to traffic management and traffic monitoring, specifically to systems and methods for detecting speed anomalies in a connected vehicle infrastructure environment.

2. Description of the Related Art

In general, traffic management and monitoring systems collect and/or process information regarding traffic conditions. Collected and/or processed information may be utilized for reasons related to safety, efficiency, environmental concerns and other issues, such as for example for detecting road hazards or unusual behavior of vehicles in a road network. Currently, incident detectors and queue detectors exist which can help to identify unexpected queues that may relate to incidents. However, known incident and queue detectors are hardware-based, using technologies such as magnetometers, microwave radar, inductive loops and cameras. Another known method is by detecting incidents through user reports, for example by using mobile software applications such as "Waze". However, such user reports need to be actively reported by motorists and cyclists. Thus, improved traffic management and monitoring is desirable.

SUMMARY

Briefly described, aspects of the present disclosure relate to a system and a method for detecting speed anomalies in a connected vehicle infrastructure environment. Collected traffic information can be used for different purposes, such as for example for detecting unusual behavior of vehicles in a road network, including for example speed anomalies of vehicles. These speed anomalies may relate to harsh braking which, when clustered in patterns, may relate to road hazards or near misses, or may relate to harsh accelerating which, when clustered in patterns, may indicate areas of reckless driving.

A first aspect of the present disclosure provides a system for detecting speed anomalies in a connected vehicle infrastructure environment comprising a plurality of roadside units installed at different locations within a road network, each roadside unit comprising a wireless receiver and configured to collect, via the wireless receiver, vehicle traffic data from vehicles travelling in a road network; a vehicle traffic data evaluation module comprising at least one processor configured via executable instructions to receive collected vehicle traffic data from the plurality of roadside units, the vehicle traffic data comprising multiple data sets of multiple vehicles, extract first data from the collected vehicle traffic data, combine and/or conform the first data with second data, create vehicle profiles based on combined and/or conformed first and second data and road segment profiles based on clustering and filtering of the vehicle profiles, compare a first vehicle profile of a first vehicle of the collected vehicle traffic data with a road segment profile, and detect and output an anomaly of the first vehicle profile of the first vehicle when the first vehicle profile is outside a predefined threshold.

A second aspect of the present disclosure provides a method for detecting speed anomalies in a connected vehicle infrastructure environment comprising through operation of at least one processor receiving vehicle traffic data provided by a plurality of roadside units, the vehicle traffic data comprising multiple data sets of multiple vehicles, extracting first data from the collected vehicle traffic data, combining and/or conforming the first data with second data, creating vehicle profiles based on combined and/or conformed first data with second data and road segment profiles based on clustering and filtering of the vehicle profiles, comparing a first vehicle profile of a first vehicle of the collected vehicle traffic data with a road segment profile, and detecting and outputting an anomaly of the first vehicle profile of the first vehicle when the first vehicle profile is outside a predefined threshold.

A third aspect of the present disclosure provides a non-transitory computer readable medium encoded with processor executable instructions that when executed by at least one processor, cause the at least one processor to carry out a method for detecting speed anomalies in a connected vehicle infrastructure environment as described herein.

BRIEF DESCRIPTION OF THE DRAWINGS

FIG. 1 illustrates a simplified block diagram of an onboard unit of a vehicle in accordance with an exemplary embodiment of the present disclosure.

FIG. 2 illustrates a simplified block diagram of a roadside unit in accordance with an exemplary embodiment of the present disclosure.

DETAILED DESCRIPTION

Figure 3:
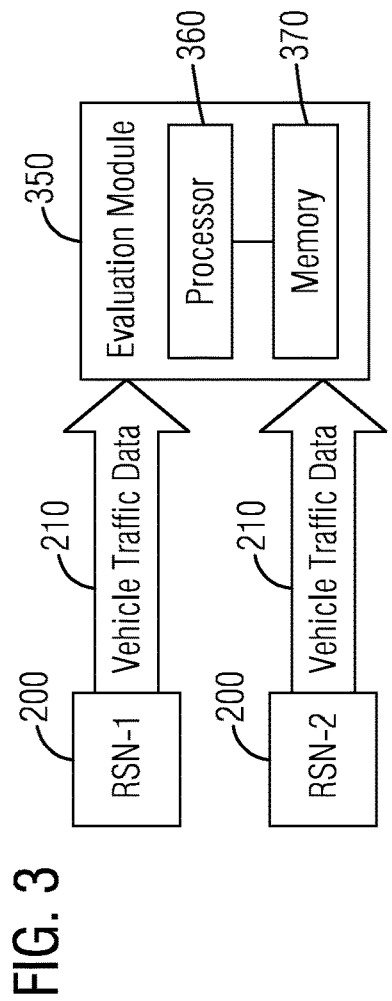
FIG. 3 illustrates a schematic diagram of a system for detecting speed anomalies in a connected vehicle infrastructure environment in accordance with an exemplary embodiment of the present disclosure.

To facilitate an understanding of embodiments, principles, and features of the present disclosure, they are explained hereinafter with reference to implementation in illustrative embodiments. In particular, they are described in the context of being systems and methods for detecting speed anomalies in a connected vehicle infrastructure environment. Embodiments of the present disclosure, however, are not limited to use in the described systems, devices or methods.

The present disclosure relates to finding new uses for connected vehicle data, provided by onboard units installed within vehicles, wherein roadside units retrieve and store standardized data and information from the onboard units of the vehicles.

FIG. 1 illustrates a simplified block diagram of an onboard unit 100, herein also referred to OBU 100, of a vehicle in accordance with an exemplary embodiment of the present disclosure. A vehicle includes many types of motor vehicles that travel within a road network, such as cars, trucks, buses etc. The onboard unit 100 is installed in a vehicle and comprises processor 104 connected between a Global Positioning System (GPS) receiver 102 and a transceiver 106. The processor 104 receives geographic location of the GPS receiver 102 and precise time of day, updated continually or periodically. The GPS receiver 102 receives the geographic location and time from the GPS. The GPS is well known and will not be described herein in detail.

Further data, such as vehicle identification data and vehicle speed data can be recorded by the onboard unit 100. The processor 104 transmits at least the location data, time data and speed data to the transceiver 106, which transmits the location data, time data and speed data wirelessly to a roadside unit 200 (see FIG. 2). In this manner, the roadside unit 200 receives continuous updates of the geographic location at a precise time and speed for every vehicle approaching from each direction that is within the broadcast area of the respective transceivers 106.

Those of skill in the art will recognize that not all details are shown in the simplified diagram of FIG. 1. For example, GPS receiver 102 may also be connected to an automobile navigation system, an emergency-communication system, or to other components of the automobile. The GPS receiver 102, processor 104, and transceiver 106 may each also be connected to a vehicle power source and/or to other systems and components of the vehicle. The processor 104, and other components, can be configured to read and write to a storage such as volatile and non-volatile memory, magnetic, optical, or solid-state media, or other storage devices. Processor 104 may be configured to perform only the processes described herein or can also be configured to perform other processes for the operation and management the vehicle. The various components of FIG. 1 may be constructed as separate elements configured to communicate with each other, or two or more of these components may be integrated into a single device.

FIG. 2 illustrates a simplified block diagram of a roadside unit 200, herein also referred to as RSU 200, in accordance with an exemplary embodiment of the present disclosure. Processor 204 of RSU 200 is connected between a control system 202 and a transceiver 206. The transceiver 206 receives data and information from multiple transceivers 106 of OBUs 100, including for example location data, time data, speed data and/or vehicle identification data etc. of multiple uniquely-identified vehicles, updated continually or periodically, illustrated via elements 220. The received data and information are herein referred to as vehicle traffic data 210. As FIG. 2 shows, the RSU 200 may receive information and data from multiple OBUs 100 of multiple vehicles.

The transceiver 206 provides received vehicle traffic data 210 to the processor 204, and the processor 204 then sends the data and information to the control system 202. The control system 202 may analyze or process and utilize the information and data for example for traffic control and management processes. Further, the RSU 200 comprises at least one memory 208, volatile or non-volatile, for storing the vehicle traffic data 210 received from the OBUs 100 of the multiple vehicles. The processor 204 is configured to read and write to the memory 208, wherein the vehicle traffic data 210 including location data, time data, speed data and other data provided by OBUs 100 are stored in the memory 208

Those of skill in the art will recognize that not all details are shown in the simplified diagram of FIG. 2. For example, control system 202, processor 204, and transceiver 206 are each also connected to a power source and may each be connected to other systems and components. The processor 204 may be configured to perform only the processes described herein or can also be configured to perform other processes for the operation and management the RSU 200. The various components of FIG. 2 can be constructed as separate elements configured to communicate with each other, or two or more of these components could be integrated into a single device. For example, processor 204 can be an integral part of the control system 202 and perform many or all the functions of the RSU 200.

In an embodiment, wireless transmission between OBUs 100 and RSUs 200 can be performed via dedicated short-range communications (DSRC). Further, multiple OBUs 100 may communicate with each other (with other OBUs 100) via DSRC, and multiple RSUs 200 may communicate with each other (with other RSUs 200) via DRSC.

In other embodiments, the OBUs 100 and RSUs 200 may communicate via a wireless communication link, such as for example wireless LAN (over Internet access point), cellular/mobile network(s) or other radio technology, such as for example via cellular V2X or via standard LTE (3G/4G).

Some or all the components of the RSU 200 can be physically located other than "roadside", such as in a traffic cabinet, traffic controller, signal head, or otherwise. The RSU 200 can be used to control many different types of traffic equipment and can be used to collect and send data to a central monitoring station for further analysis or action, using common networking and communication techniques.

FIG. 3 illustrates a schematic diagram of a system 300 for detecting speed anomalies in a connected vehicle infrastructure environment in accordance with an exemplary embodiment of the present disclosure. Generally, the system 300 includes multiple roadside units 200, such as RSU-1 and RSU-2, the roadside units 200 configured for example as described with reference to FIG. 2.

Further, system 300 includes vehicle traffic data evaluation module 350, herein also referred to as evaluation module 350, comprising at least one processor 360 and a memory 370, wherein the vehicle traffic data evaluation module 350 is configured to receive and process vehicle traffic data 210 provided by RSU-1 and RSU-2. Although system 300 illustrates only two RSUs 200, the vehicle traffic data evaluation module 350 may receive or collect and process data from many RSUs 200.

In exemplary embodiments, the memory 370 may include any of a wide variety of memory devices including volatile and non-volatile memory devices, and the at least one processor 360 may include one or more processing units.

The vehicle traffic data evaluation module 350 may be embodied as software or a combination of software and hardware. The vehicle traffic evaluation module 350 may be a separate module or may be an existing module programmed to perform a method as described herein. For example, the vehicle traffic data evaluation module 350 may be incorporated, for example programmed, into an existing traffic management or monitoring device, by means of software.

The memory 370 of the evaluation module 350 includes software with a variety of applications. One of the applications includes a method for detecting speed anomalies in a connected vehicle infrastructure environment. For this application, the at least one processor 360 of the evaluation module 350 is configured, via executable instructions, to collect or receive and process and analyze vehicle traffic data 210 and detect and output speed anomalies as described herein. Of course, the at least one processor 360 may be configured to perform only the process(es) described herein or can also be configured to perform other processes.

In general, the at least one processor 360 is configured to receive collected vehicle traffic data 210 from the plurality of roadside units 200. The vehicle traffic data 210 comprise multiple data sets of multiple vehicles. The at least one processor 360 is further configured to extract first data from the collected vehicle traffic data 210, combine the first data with second data, create vehicle profiles and segment profiles based on combined first and second data, compare a first data set of a first vehicle of the collected vehicle traffic data with the vehicle profiles, and detect and output an anomaly of the first data set of the first vehicle when the first data set is outside a predefined threshold.

Figure 4:
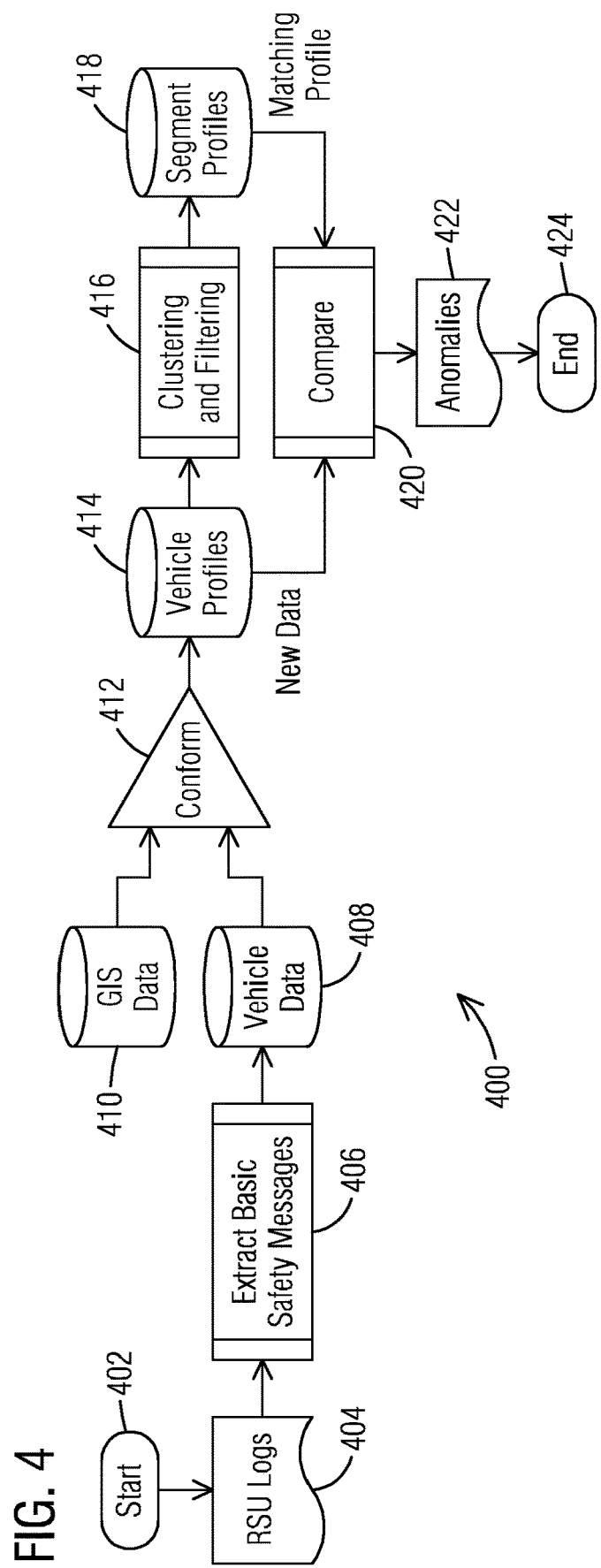
FIG. 4 illustrates a flow chart of a method for detecting speed anomalies within a connected vehicle infrastructure environment in accordance with an exemplary embodiment of the present disclosure.

FIG. 4 illustrates a flow chart of a method 400 for detecting speed anomalies within a connected vehicle infrastructure environment in accordance with an exemplary embodiment of the present disclosure. While the method 400 is described as a series of acts that are performed in a sequence, it is to be understood that the method 400 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method may start at 402. At 404, the vehicle traffic data 210, embodied for example as RSU logs (roadside unit logs), which include data sets of multiple vehicles, are received by the evaluation module 350 for processing and evaluating. For example, the evaluation module 350 may collect the RSU logs from the RSUs 200 via a communications link, wired or wireless, for example via an Ethernet cable or other suitable means to connect with the RSUs 200. The RSU logs may be collected by the evaluation module 350 itself in an automated manner, for example periodically. In another embodiment, the RSU logs may be transferred manually to the evaluation module 350.

The method 400 may include an act or process 406 of extracting data from the vehicle traffic data 210. Specifically, act 406 comprises extracting basic safety messages, herein referred to as BSM or BSMs, from the RSU logs. A basic safety message is a standardized message set specified by the Society of Automotive Engineers (SAE) standards including a standardized set of data. The basic safety message standard is specified in SAE J2735. Each basic safety message includes data and information, including for example data of GPS location, speed, data and time of the respective vehicle that recorded these data in its OBU 100 (see FIG. 1). In an example, an OBU 100 may generate and transmit about 10 basic safety messages per second, for example to an RSU 200, which are then further transmitted to the evaluation module 350. Considering the amount of about 10 basic safety messages per second and per vehicle, the RSU 200 collects a large amount of data (RSU logs) and in turn the evaluation module 350 processes and evaluates are large amount of data.

From the extracted BSMs, vehicle data 408 including speed, GPS location, data and time are used for further processing. These vehicle data 408 are herein referred to as first data. The method 400 further comprises an act 412 of combining and/or conforming the first data with second data 410. The second data 410 comprise geographic information system (GIS) data or derivations of GIS data. For example, GIS data may be interpolated since interpolated GIS data may be more suitable for the described method 400. In embodiments, GIS line-string data, e.g., such as those provided by OpenStreetMaps, Google Maps, HERE, INRIX, are used, wherein the first data 408 are paired with specific segments of a road. This means that the vehicle data 408 are placed in a specific road segment in accordance with corresponding location data, date/time data and speed data recorded by an OBU 100 of a respective vehicle. By combining and/or conforming the vehicle data 408 with the GIS data 410, vehicle profiles 414 are created or generated.

The method 400 may further comprise an act 416 of creating road segment profiles 418 for a given road segment based on speed, location and date and time provided by the BSMs of the multiple vehicles. Specifically, the segment profiles 418 comprise speed segment profiles which are created by clustering and filtering of the vehicle profiles 414, which are based on speed, location, date and time information combined with the GIS data 410, utilizing for example an unsupervised clustering method. Such an unsupervised clustering method may be for example k-means clustering. It should be noted that k-means clustering will not be described in detail herein as those skilled in the art are familiar with this method.

Once the speed segment profiles 418 are created (using a sufficient amount of data sets of vehicles), new vehicle traffic data, e.g. a new vehicle profile 414 is compared with established segment profiles 418, see act 420. In an exemplary embodiment of the present disclosure, a (new) vehicle profile 414 is paired and/or compared with a speed segment profile 418 using discrete Fréchet distance. The Fréchet distance is known in the field of mathematics and thus will not be explained in detail herein. Fréchet distance can be used as a measure between curves. In our example, a speed segment profile 418 can be considered a first curve. Then, a new vehicle data set 408, considered a second curve, is compared with the first curve (segment profile). The comparing is performed by applying discrete Fréchet distance that is based on a threshold of a reduction in speed. When the second curve lies outside the Fréchet distance based on the threshold, a speed anomaly 422 is detected and output by the evaluation module 350. Detected anomalies 422, when clustered in patterns, may relate to road hazards or near misses (harsh braking), or to reckless driving (harsh acceleration). In an example, the threshold of the reduction in speed comprises a 50% reduction in speed. In other examples, the threshold may comprise more or less than 50% reduction in speed, for example 40% or 60%. Thus, sudden drops in speed, for example due to sudden braking or deceleration of the vehicle, can be detected. At 424, the method 400 may end.

It should be appreciated that the described method 400 may include additional acts and/or alternative acts corresponding to the features described previously with respect to the system 300 and evaluation module 350 (see FIG. 3).

The described system 300 and method 400 provide an algorithm designed for detecting a speed anomaly using a combination of machine learning, e.g. k-means clustering, and a statistical approach which is the discrete Fréchet distance. A new use case for connected vehicle data is described, allowing road authorities to utilize generated data by leveraging connected vehicle infrastructure investments. Further, the provided system 300 and method 400 reduce the need for road authorities to invest on dedicated detection infrastructure, enabling the same use case to be catered for with data and machine learning instead; thus, reducing overall cost of ownership of a similar solution for incident detection. The provided solution opens opportunities for detection of near misses which may not usually get reported by citizens or road users. Such near misses may indicate underlying patters for potential unsafe areas, enabling road authorities to proactively verify hotspots that could reduce accidents and thus help for example with the US Department of Transportation's 'Vision Zero' initiatives. Further, data and information relating harsh acceleration, which may relate to reckless driving, can help cities identify areas where enforcement should be supplied in order to avoid or reduce reckless driving behavior which may end up in accidents or incidents on the road network.

The approach is designed with minimum data of the Basic Safety Messages, e.g., speed, GPS location, data and time. This preserves user privacy at core while helping to create or support functionalities for safety increase of roads.

It should be appreciated that acts associated with the above-described methodologies, features, and functions (other than any described manual acts) may be carried out by one or more data processing systems, such as for example evaluation module 350, via operation of at least one processor 360. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the processor 360 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor 360 with the executable instructions (e.g., software/firmware apps) loaded/installed into a memory (volatile and/or non-volatile), which are currently being executed and/or are available to be executed by the processor 360 to cause the processor 360 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A system for detecting speed anomalies in a connected vehicle infrastructure environment, comprising:
   a plurality of roadside units installed at different locations within a road network, each roadside unit comprising a wireless receiver and configured to:
     collect, via the wireless receiver, vehicle traffic data about vehicles travelling in the road network; and
     send the vehicle traffic data to a vehicle traffic data evaluation module; and
   the vehicle traffic data evaluation module configured to:
     receive collected vehicle traffic data from the plurality of roadside units, the vehicle traffic data comprising multiple data sets associated with multiple vehicles;
     extract safety messages including speed data, location data, and timestamp data from the vehicle traffic data;
     create a plurality of vehicle profiles associated with the multiple vehicles based on combining the safety messages with geographic information system (GIS) data, wherein each vehicle profile of the plurality of vehicle profiles comprises speed data, location data, and timestamp data associated with a vehicle of the multiple vehicles;
     create a plurality of road segment profiles associated with segments of the road network for a specific time period based on clustering and filtering the plurality of vehicle profiles;
     calculate one or more discrete Fréchet distances between one or more of the plurality of vehicle profiles and one or more of the plurality of road segment profiles;
     detect one or more anomalies when the one or more discrete Fréchet distances exceed a threshold of speed reduction;
     output a notification of the one or more anomalies to one or more of the plurality of roadside units, the notification indicating the one or more anomalies and one or more locations associated with the one or more anomalies along the road network;
     cluster the one or more anomalies indicated in one or more notifications to identify at least one traffic safety concern, wherein the at least one traffic safety concern includes at least one of a road hazard, near miss, or reckless driving; and
     cause at least one roadside unit to control one or more types of traffic equipment associated with the road network.

2. The system of claim 1, wherein the GIS data comprise derivations of GIS data.

3. The system of claim 1, wherein the plurality of road segment profiles comprise speed profiles for a segment of the road network for a specific date and a specific time.

4. The system of claim 3, wherein in order to create the plurality of road segment profiles, the vehicle traffic data evaluation module is further configured to utilize an unsupervised clustering method.

5. The system of claim 1, further comprising a plurality of onboard units, each onboard unit installed in a respective vehicle of the multiple vehicles and configured to record vehicle data including speed data, location data, and timestamp data of the respective vehicle and generate one or more of the safety messages.

6. A method performed through operation of at least one processor for detecting speed anomalies in a connected vehicle infrastructure environment comprising, the method comprising:

receiving vehicle traffic data provided by a plurality of roadside units, the vehicle traffic data comprising multiple data sets associated with multiple vehicles;

extracting safety messages including speed data, location data, and timestamp data from the vehicle traffic data;

creating a plurality of vehicle profiles associated with the multiple vehicles based on combining the safety messages with geographic information system (GIS) data, wherein each vehicle profile of the plurality of vehicle profiles comprises speed data, location data, and timestamp data associated with a vehicle;

creating a plurality of road segment profiles associated with segments of a road network for a specific time period based on clustering and filtering the plurality of vehicle profiles;

calculating one or more discrete Fréchet distances between one or more of the plurality of vehicle profiles and one or more of the plurality of road segment profiles;

detecting one or more anomalies when the one or more discrete Fréchet distances exceed a threshold of speed reduction;

outputting a notification of the one or more anomalies to one or more of the plurality of roadside units, the notification indicating the one or more anomalies and one or more locations associated with the one or more anomalies along the road network;

clustering the one or more anomalies indicated in one or more notifications to identify at least one traffic safety concern, wherein the at least one traffic safety concern includes at least one of a road hazard, near miss, or reckless driving; and causing at least one roadside unit to control one or more types of traffic equipment associated with the road network.

7. The method of claim 6, wherein the GIS data comprise derivations of GIS data that are combined with data of the safety messages.

8. The method of claim 7, wherein creating the plurality of road segment profiles comprises creating speed profiles for a segment of the road network for a specific date and a specific time.

9. The method of claim 8, wherein creating the speed profiles comprises utilizing an unsupervised clustering method.

10. A non-transitory computer readable medium encoded with processor executable instructions that when executed by at least one processor, causes the at least one processor to:

receive vehicle traffic data provided by a plurality of roadside units, the vehicle traffic data comprising multiple data sets associated with multiple vehicles;

extract safety messages including speed data, location data, and timestamp data from the vehicle traffic data;

create a plurality of vehicle profiles associated with the multiple vehicles based on combining the safety messages with geographic information (GIS) data, wherein each vehicle profile of the plurality of vehicle profiles comprises speed data, location data, and timestamp data associated with a vehicle of the multiple vehicles;

create a plurality of road segment profiles associated with segments of a road network for a specific time period based on clustering and filtering the plurality of vehicle profiles;

calculate one or more discrete Fréchet distances between one or more of the plurality of vehicle profiles and one or more of the plurality of road segment profiles;

detect one or more anomalies when the one or more discrete Fréchet distances exceed a threshold of speed reduction, output a notification of the one or more anomalies to one or more of the plurality of roadside units, the notification indicating the one or more anomalies and one or more locations associated with the one or more anomalies along the road network;

cluster the one or more anomalies indicated in one or more notifications to identify at least one traffic safety concern, wherein the at least one traffic safety concern includes at least one of a road hazard, near miss, or reckless driving; and cause at least one roadside unit to control one or more types of traffic equipment associated with the road network.

* * * * *